(12) United States Patent
Colnot

(10) Patent No.: US 6,393,567 B1
(45) Date of Patent: May 21, 2002

(54) METHOD OF ENABLING A SERVER TO AUTHORIZE ACCESS TO A SERVICE FROM PORTABLE DEVICES HAVING ELECTRONIC MICROCIRCUITS, E.G. DEVICES OF THE SMART CARD TYPE

(75) Inventor: Cédric Colnot, Ivry-sur-Seine (FR)

(73) Assignee: ELVA SA, Boulogne Billancourt ( * ) Notice: Subject to any disclaimer, the term of this patent is extended or adjusted under 35 U.S.C. 154(b) by 0 days.

(21) Appl. No.: 09/125,222

(22) PCT Filed: Feb. 13, 1997

(86) PCT No.: PCT/FR97/00276

§ 371 Date: Dec. 14, 1998

§ 102(e) Date: Dec. 14, 1998

(87) PCT Pub. No.: WO97/30424

PCT Pub. Date: Aug. 21, 1997

(30) Foreign Application Priority Data

Feb. 15, 1996 (FR) ............................................. 96 01872

(51) Int. Cl.$^7$ ................................................. G06F 1/24

(52) U.S. Cl. ........................ 713/182; 713/170; 713/200; 713/201; 380/249

(58) Field of Search ........................ 380/249; 713/172, 713/170, 182, 200, 201

(56) References Cited

U.S. PATENT DOCUMENTS

| | | | | | |
|---|---|---|---|---|---|
| 5,191,610 | A | * | 3/1993 | Hill et al. ...................... | 380/21 |
| 5,363,448 | A | * | 11/1994 | Koopman, Jr. et al. ....... | 380/25 |
| 5,369,706 | A | * | 11/1994 | Latka .......................... | 380/23 |
| 5,377,270 | A | * | 12/1994 | Koopman, Jr. et al. ....... | 380/25 |
| 5,598,475 | A | * | 1/1997 | Soenen et al. ................ | 380/23 |

FOREIGN PATENT DOCUMENTS

| | | |
|---|---|---|
| DE | 44 11 450 C1 | 3/1995 |
| EP | 0 219 060 A2 | 4/1987 |
| EP | 0 265 728 A2 | 5/1988 |
| EP | 0 372 285 A1 | 6/1990 |
| EP | 0 385 070 A1 | 9/1990 |
| EP | 0 459 781 A1 | 12/1991 |
| EP | 0 605 996 A1 | 7/1994 |

* cited by examiner

Primary Examiner—Thomas R. Peeso
(74) Attorney, Agent, or Firm—Morgan, Lewis & Bockius LLP

(57) ABSTRACT

When access is requested, the method consists in causing the portable device to transmit at least an identity sequence containing at least the value of a cryptogram ($C_i$) which is the result of an iterative algorithm (A2) being executed that is based on a non-invertible secret-key function (F2), and in causing the server to compute successive cryptograms ($Q_1$, $Q_2$, . . . ) on the basis of a cryptogram ($Q_0$) and by using the same algorithm (A2) until a cryptogram ($Q_n$) is found whose value is equal to the value of the cryptogram ($C_i$) so as to validate access. The method is suitable in particular for use in a home banking application.

11 Claims, 1 Drawing Sheet

METHOD OF ENABLING A SERVER TO AUTHORIZE ACCESS TO A SERVICE FROM PORTABLE DEVICES HAVING ELECTRONIC MICROCIRCUITS, E.G. DEVICES OF THE SMART CARD TYPE

The present invention relates to a method of enabling a server to authorize access to a service on the basis of portable devices having electronic microcircuits, e.g. devices of the smart card type.

In the nineteen-seventies, the advent of the concept of a card having electronic microcircuits, now commonly referred to as a "smart card" or a "chip card", and incorporating in particular a microprocessor and a non-volatile memory of the EEPROM type, opened up numerous applications, in particular for use by the general public, with the appearance of card-operated public telephones, and then banking terminals taking advantage of the facilities offered by the microprocessors incorporated in such cards.

In general, such a card can be used as a mere access key for obtaining access to a service, whether such access be customized or otherwise, and whether it be secure or otherwise, and/or as a means for validating information transfer, e.g. between two cards, between a card and a terminal, or between two terminals, whether such information is confidential or otherwise, and whether the transfer takes place remotely or otherwise.

In most of the intended applications, access to a service or the transfer of information is preceded by executing an identification protocol of the one-way type or of the both-way type, which protocol takes into account at least one item of specific information that is prerecorded in the memory of the card.

The specific information taken into account in an identification protocol may be a confidential code or "PIN" code which is allocated to the bearer of the card and which enables the microprocessor of the card to authenticate said bearer before authorizing the bearer to access the requested service, as in the case of a banking transaction, for example.

The specific information taken into account in an identification protocol may also be a code specific to the service requested by the bearer of the card.

In which case, the code contained in the card is transmitted remotely or otherwise to a server for identification purposes. The identification protocol is either one-way, in which case the server authorizes access to the requested service merely on the basis of recognizing the code transmitted by the card, or both-way, in which case the server authorizes access to the requested service after various codes have been interchanged, which codes are computed separately in the card and in the server, such codes taking into account a secret key and/or random numbers, for example.

The codes computed separately in the card and in the server may be cryptograms, but each cryptogram transmitted by the card to the server must be accompanied by synchronization information to enable the server to authenticate the cryptogram transmitted by the card. The synchronization information may be a time stamp, but that requires either the contents of a counter, or a time base in the card, which time base must be synchronized with the time base of the server. Such solutions are described in particular in Documents U.S. Pat. No. 4,601,011 and EP-A-0 451 056.

Such solutions suffer, in particular, from the drawback of being complex and difficult to implement.

An object of the invention is to design an identification protocol that is simple and easy to implement, while guaranteeing a degree of security that is high enough to protect it from fraudulent users or "attackers".

To this end, the invention provides a method of enabling a server to authorize access to a service from portable devices having electronic microcircuits, e.g., devices of the smart card type, said method being characterized in that it consists of initializing each portable device and the server, and, when a user requests access from a portable device, the method consists, in a synchronization first step, of:

causing the portable device to transmit at least a first identity sequence containing at least an identity number $N_c$ allocated to the portable device and a cryptogram $C_i$ computed by processing circuits of the portable device, this cryptogram $C_i$ being the result of an iterative algorithm A2 being executed that is based on a non-invertible secret-key function F2, and being such that its value is computed at least on the basis of the value of the preceding cryptogram $C_{i-1}$;

transmitting the first identity sequence to the server via a terminal;

causing processing circuits of the server to use the same iterative algorithm A2 as the algorithm used by the portable devices to compute successive cryptograms $Q_1, Q_2, \ldots$ on the basis of a cryptogram $Q_0$ stored in the server and whose value is equal to the value of the cryptogram $C_{i-n}$ which was contained in the most recent identity sequence transmitted by the portable device to the server, until a cryptogram $Q_n$ is found whose value is equal to the value of the cryptogram $C_i$ contained in the first identity sequence; and giving a new value to the cryptogram $Q_0$ stored in the server, which new value is equal to the value of the cryptogram $C_i$;

and in that the method consists, in an authentication second step, of causing the access request to be validated by the server only if at least the synchronization first step has been satisfied.

To reinforce the security of the identification protocol, and according to another characterisic of the invention, in the authentication second step and once the synchronization step has been satisfied, the method consists of:

causing the portable device to transmit a second identity sequence containing at least the identity number $N_c$ allocated to the portable device and the cryptogram $C_{i+1}$ computed by the portable device on the basis of the cryptogram $C_i$ contained in the first identity sequence and stored in the portable device;

transmitting the second identity sequence to the server via the terminal;

causing the server to execute the algorithm $A_2$ so as to compute the cryptogram $Q_1$ on the basis of the value of the cryptogram $Q_0$ stored in the server;

causing the access request to be validated by the server only if the values of the two cryptograms $C_{i+1}$ and $Q_1$ are equal; and giving a new value to the cryptogram $Q_0$ stored in the server, which new value is equal to the value of the cryptogram $C_{i+1}$.

The fact that two identity sequences must be transmitted successively by the portable device before the server authorizes access makes it possible to reinforce its security against attackers.

In general, during the synchronization step and during the authentication step, the methods also consists of:

causing each portable device to compute and store a new cryptogram $C_{i+1}$ when it transmits an identity sequence containing the previously computed cryptogram $C_i$; and causing the algorithms A2 for computing the cryptograms of the portable devices and of the server to take into account confidential data $G_c$ allocated to the portable device by an authorized person.

Thus, on each request for access to the server from a portable device, the server manages an identification protocol which comprises a synchronization step and an authentication step.

The identification protocol can run only if each portable device and the server have been initialized, i.e. only if they contain the information necessary to be able to execute the identification protocol.

In general, initializing each portable device consists of storing at least the following items of information in a non-volatile memory of the EEPROM type in the portable device:

an identity number $N_c$ allocated to the portable device;

confidential data $G_c$ allocated to the portable device; and the value of an initial cryptogram $C_0$ to enable the portable device to be able then to compute the successive cryptograms $C_1, C_2, \ldots$ During initialization of the portable device, the method may consist of diversifying or varying the confidential data $G_c$ allocated to each portable device on the basis of base data, and on the basis of an algorithm A1 corresponding to a function F1 having a secret key $K_s$, the base data being, for example, the identity number $N_c$ allocated to each portable device.

The portable devices are initialized by an authorized person prior to being delivered to users. As a function of the intended applications, it is naturally possible to store other information in each portable device, but the information concerning the identity number $N_c$, the confidential data $G_c$, and the value of the initial cryptogram $C_0$ are necessary to implement the identification protocol in a preferred implementation, regardless of the intended application.

In general, initializing the server consists of causing the server to store the specific data allocated to each portable device so as to be able to implement the synchronization step and the authentication step resulting in or preventing access to the service requested by the user. In practice, the following are stored in a file of the server and for each portable device: the identity number $N_c$; the confidential data $G_c$ or the secret key $K_s$ enabling the server to compute said confidential data each time the portable device is used; and a cryptogram $Q_0$ whose value is equal to the value of the initial cryptogram $C_0$ so as to be able to compute the successive cryptograms $Q_1, Q_2, \ldots$ on the same basis as the basis used by the portable devices for computing the successive cryptograms $C_1, C_2, \ldots$ Initialization of the server is also performed by an authorized person who is not necessarily the same person as the person who initializes the portable devices. Depending on the intended applications, initialization of the server is either performed entirely prior to delivering the portable devices to users, or else it is completed the first time access to the server is requested, with users already being in possession of the portable devices.

These initialization operations for initializing the portable devices and the server are explained in detail below in examples of applications of the method.

An important advantage of the invention is that the method can be implemented in numerous and varied applications including home banking, remote payment of tolls, and motor vehicle alarms, where access to a service from a portable device is authorized or not authorized as a function of the result of execution of an identification protocol under the control of a server which manages the requested service and which is connected to a terminal that provides the interface between the portable device and the server.

Another advantage of the invention is that the method can be implemented by simple means, in particular as regards the portable devices which substantially reproduce the known characteristics of smart cards, and in particular of cards equipped with voice or radio-frequency output interfaces for transmitting the identity sequences to the server.

Other characteristics, advantages, and details of the invention are explained below with reference to the three above-mentioned applications to emphasize the diversity of the applications for which the invention may be advantageous.

DETAILED DESCRIPTION OF THE PREFERRED EMBODIMENTS

Figure 1:
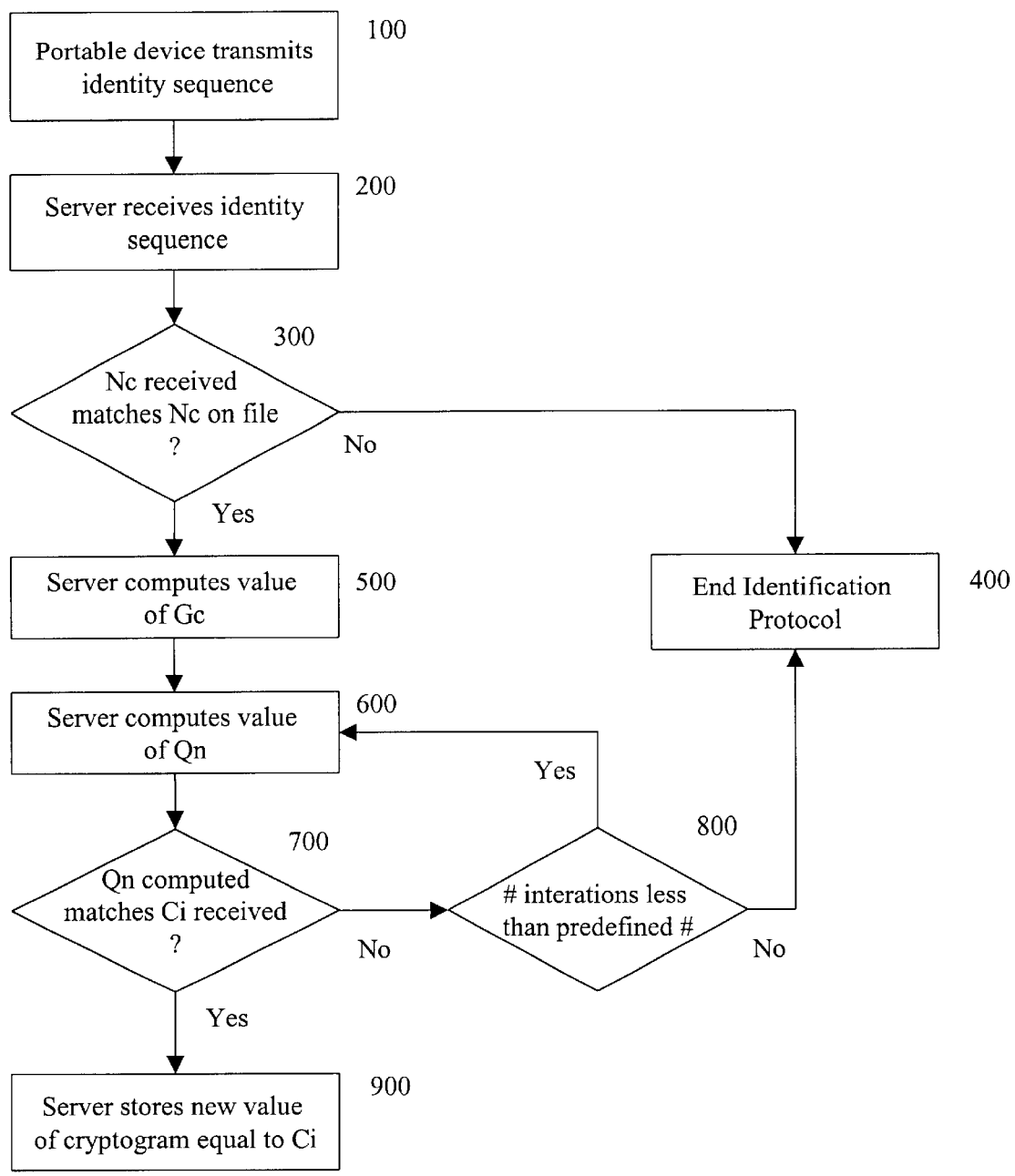
FIG. 1 shows the process of steps in a synchronization first step.

In general, the method of the invention involves at least the following:

an algorithm A1 based on a secret-key function F1 for computing confidential data $G_c$ such that:

$$G_c = F1(K_s, N_c)$$

where $K_s$ is a secret key and $N_c$ is the base data allocated to each portable device; and an iterative algorithm A2 based on a non-invertible secret-key function F2 for computing successive cryptograms $C_1, C_2, \ldots$ such that:

$$C_1 = F2(G_c, C_0)$$

$$C_{i+1} = F2(G_c, C_i)$$

To implement the method of the invention, each portable-device, referred to below as a "card", includes, in known manner, at least the following: a non-volatile memory of the EEPROM type; processing circuits such as a processor; and an input/output interface. The server includes information storage media and associated processing circuits. The algorithm A2 which is executed by the cards is advantageously hard-wired, whereas the algorithms A1 and A2 which are executed by the server are stored in the form of software.

In general, and regardless of the intended application, the cards must be initialized before they are distributed to the users.

Such initialization operations are performed by an authorized person referred to below as a "distributor", and they consist of allocating to each card at least the following:

an identity number $N_c$;

confidential data $G_c$; and the value of a cryptogram $C_0$.

Each identity number $N_c$ is in the form of alphanumeric data, and the value of the initial cryptogram $C_0$ is a function of the intended application.

The confidential data $G_c$ allocated to each card may be the result of an initial computation resulting from the above-mentioned algorithm A1 being executed, and this is the case for the applications described below in which the confidential data $G_c$ is diversified or varied by the distributor on the basis of base data and of the algorithm A1 having a secret key $K_s$ allocated to a batch of cards, the base data being, for example, the identity number $N_c$ allocated to each card. Thus, the confidential data $G_c$ allocated to each card is such that:

$$G_c = F1(K_s, N_c)$$

The initialization data which is different for each card is stored by the distributor in the respective memories of the cards.

In parallel, the distributor must initialize the serer, this consisting of giving the server the means to be able to identify each card by its identity number $G_c$, to know the value of the confidential data $G_c$ or the elements that enable it to compute this data, and to know the value of the initial cryptogram $C_0$.

For this purpose, the distributor opens a file in the memory of the server in which, for each initialized card, the distributor stores the identity number $N_c$ while associating it firstly with the value of the confidential data $G_c$ or the elements enabling it to compute said confidential data, and secondly with a cryptogram $Q_0$ whose value is equal to the value of the initial cryptogram $C_0$.

In a first application to home banking, the distributor initializes each card by storing in its memory an identity number $N_c$, confidential data $G_c$, and the value of an initial cryptogram $C_0$, this information being different from one card to another. In this first application, the value of the cryptogram $C_0$ is arbitrary and, for example, it may be equal to zero.

Once these items of information have been stored in the card, the distributor reads the value of the cryptogram $C_0$, thereby automatically causing the algorithm A2 to be executed so as to compute the cryptogram $C_1$ whose value is a function of the confidential data $G_c$ and of the value of the preceding cryptogram $C_0$, and the value of the cryptogram $C_1$ is stored in the card in place of the value of the cryptogram $C_0$.

During the operation of initializing the server, for each card of a batch of cards and in a file of the server, the distributor stores the identity number $N_c$, the secret key $K_s$ allocated to the batch of cards to make it possible for the value of the confidential data $G_c$ to be subsequently computed, and a cryptogram $Q_0$ whose value is equal to the value of the initial cryptogram $C_0$.

In this first application, each card may advantageously be equipped with a voice output interface and with an input/output interface having contacts.

The user can thus access the server from a telephone set connected to the server via the telephone network. Once the link has been set up with the server, the identification protocol for identifying the user card is engaged by the server to accept or refuse the requested access, the protocol involving a first step of synchronization and a second step of authentication.

FIG. 1 step 100 illustrates the synchronization first step, including the step in which the server requests the user to cause the card to transmit at least one first identity sequence, containing the identity number $N_c$ and the value of the cryptogram $C_1$, or more generally of the cryptogram $C_i$, that are stored in the card.

This first identity sequence is transmitted in the form of a voice sequence, which is transmitted to the server via the microphone of the telephone handset. In general, this transmission is caused by depressing a button provided on the card and, following this transmission, the card automatically executes the algorithm A2 so as to compute a new cryptogram $C_{i+1}$ whose value is stored in place of the cryptogram $C_i$.

After receiving the first identity sequence step 200, the server searches in its file for an identity number Nc corresponding to the identity number that has just been transmitted by the card, step 300. If this search is unsuccessful, the identification protocol is stopped, step 400, and the server does not validate the requested access. Otherwise, the synchronization first step continues and the server takes the values of the secret key Ks and of the initial cryptogram $Q_0$ that are associated with the card identity number Nc that the server has found in its file.

First, the server computes the value of the confidential data Gc, step 500, of the card on the basis of the secret key Ks and of the identity number Nc of the card. For this purpose, the server executes the algorithm A1 such that:

$$Gc = F1(Ks, Nc)$$

Second, the server executes the algorithm A2 so as to compute a first cryptogram $Q_1$ on the basis of the confidential data Gc and of the value of the cryptogram $Q_0$, such that:

$$Q_1 = F2(Gc, Q_0)$$

then a second cryptogram such that $$Q_2 = F2(Gc, Q_1)$$

step 600 is repeated until a cryptogram $Q_n$ is found whose value is equal to the value of the cryptogram $C_i$, step 700, contained in the first identity sequence transmitted by the card.

In step 800, if these values are not equal after a predefined number of iterations, the synchronization first step goes to step 400, the identification protocol is stopped and the server does not validate the requested access. Otherwise, in step 900, the cryptogram $Q_0$ associated with the identity number Nc of the card in the file of the server is given a new value which is equal to the value of the cryptogram $C_i$ transmitted by the card, and the synchronization first step is considered to be satisfied.

In an authentication second step, the server either accepts or refuses the access requested by the user. In practice, this authentication second step can be considered to be satisfied if at least the synchronization first step has been satisfied.

However, to improve the security of an identification protocol in a home banking application, the authentication second step consists of causing the card to transmit a second identity sequence again containing the identity number $N_c$ of the card together with the value of the cryptogram $C_{i+1}$ which has been computed automatically by the card following transmission of the first identity sequence. The second identity sequence is also transmitted in voice form and is transmitted to the server via the microphone of the telephone handset. On reception, the server verifies that the identity number $N_c$ transmitted by the card is identical to the identity number that was contained in the first identity sequence, and it executes the algorithm $A_2$ again so as to compute the cryptogram $Q_1$ on the basis of the confidential data $G_c$ of the card, that the server has already computed after receiving the first sequence, and on the basis of the value of the cryptogram $Q_1$ must be equal to the value of the cryptogram $C_{i+1}$ contained in the second identity sequence transmitted by the card.

If these values are not equal, the server does not validate the access request by the user. Otherwise, the server gives a new value to the cryptogram $Q_0$ associated with the identity number $N_c$ of the card, which new value is equal to the value of the cryptogram $C_{i+1}$ transmitted by the card, and the server validates the access request by the user.

Security is reinforced as a result of providing two identity sequences. An attacker might just, by chance, dial a first identity sequence with a first cryptogram whose value is equal to the value of a cryptogram $Q_k$ computed by the server after receiving the first identity sequence, but it is statistically almost impossible for such a person to be able to dial immediately afterwards a second identity sequence with a second cryptogram whose value is equal to the cryptogram $Q_{k+1}$ computed by the server after receiving the second identity sequence. In other words, it is impossible for an attacker to be able to transmit two successive cryptograms successfully without being in possession of the card.

In such an application to home banking, access is personal. Once the identification protocol has been satisfied, the user's confidential code or "PIN" code must be transmitted for the user to be authenticated by the server.

In a second application to remote payment of tolls, the distributor also initializes the server and a batch of cards prior to distributing the cards to the users.

During initialization of each card in the batch, the distributor stores in each card an identity number $N_c$, confidential data $G_c$, and the value of the initial cryptogram $C_0$. In this second application, the value of the cryptogram $C_0$ is advantageously diversified or varied on the basis of base data, and on the basis of the algorithm A1 having a secret key $K_m$ (different from $K_s$), this base data also being the identity number $N_c$ allocated to the card.

However, the server is initialized only partially by the distributor before the cards are distributed to the users. This partial initialization of the server consists of storing in a file of the server the identity numbers allocated to the batch of cards, and the secret key $K_s$ associated with the batch so as to enable the server to be able then to compute the value of the confidential data $G_c$ of each card. In other words, before the card is used for the first time, the server does not store any value for an initial cryptogram $Q_0$.

The initialization of the server is completed when the user requests access to the server for the first time via a toll terminal. In which case, as the motor vehicle goes past, the toll terminal causes the card to transmit a first identity sequence containing at least the identity number $N_c$ of the card and the value of the cryptogram $C_0$, as stored in the card. For this second application, each card is advantageously equipped with a radio-frequency output interface.

The first sequence is transmitted to the server, and the server searches to determine whether the identity number $N_c$ corresponding to the number that has just been transmitted by the card does indeed belong to the batch of cards. If the search is unsuccessful, the server detects and records that a motor vehicle has gone through a toll station illegally. Otherwise, the server records in a file the identity number $N_c$ of the card and associates it with a cryptogram $Q_0$ whose value is equal to the cryptogram $C_0$ o transmitted by the card.

Then, the terminal causes a second identity sequence to be transmitted, which sequence contains again the identity number $N_c$ of the card and the cryptogram $C_1$ which has been computed automatically by the card following transmission of the first identity sequence. After the second identity sequence has been transmitted, the server searches in its file for the identity number $N_c$ corresponding to the number that it has just received from the card, and it computes firstly the value of the confidential data $G_c$ of the card by executing the algorithm A1 which takes into account the identity number $N_c$ of the card and the value of the secret key $K_s$ allocated to the batch of cards.

Then, on the basis of the cryptogram $Q_0$ that it has associated with the identity number $N_c$ of the card, and on the basis of the confidential data $G_c$, the server computes the cryptogram $Q_1$ by executing the algorithm A2, and it verifies that the value of said cryptogram is indeed equal to the value of the cryptogram $C_1$ contained in the second identity sequence. If these values are equal, the motor vehicle goes through the toll station legally, and the server gives a new value to the cryptogram $Q_0$ associated with the identity number $N_c$ of the card, which new value is equal to the value of the cryptogram $C_1$ transmitted by the card.

In this remote toll-paying application, initialization of the server is completed after the server has received two consecutive identity sequences transmitted by the card when the motor vehicle drives past for the first time. Advantageously, when the vehicle passes through on following occasions, the card transmits a single identity sequence only, and the identification protocol is limited to the synchronization first step that is described above in the case of a home banking application, and that suffices to authenticate the card.

In this remote toll-payment application, the cards are not personal.

In a third application, the method may be used in an alarm system designed for a motor vehicle. As in the preceding applications, each card must be initialized, as must the server which is constituted in this example by an alarm system specific to each motor vehicle.

The cards are initialized by the distributor, it being possible for one or more cards to be allocated to the same user. Each card is then initialized by storing in its memory an identity number $N_c$, confidential data $G_c$, and the value of an initial cryptogram $C_0$ which, in this particular application, is equal to the confidential data $G_c$.

Preferably, the cards are then locked by the distributor to prevent them from being used in the event they are stolen, for example.

At this stage, the alarm systems of the motor vehicles are not yet initialized. When the user takes possession of the motor vehicle, the distributor initializes the alarm system of the vehicle. This operation consists of unlocking the cards, in connecting one of the cards to the alarm system, and in causing said card to transmit a first identity sequence containing at least the identity number $N_c$ and the value of the initial cryptogram $C_0$ which is equal to the value of the confidential data $G_c$. In a non-volatile memory of the EEPROM type, the alarm system stores the identity number $N_c$, a cryptogram $Q_0$ whose value is equal to the value of the initial cryptogram $C_0$ transmitted by the card, and confidential data $G_c$ having a value equal to the value of the cryptogram $Q_0$.

The distributor then causes the card to transmit a second identity sequence again containing the identity number $N_c$ of the card plus the cryptogram $C_1$ as computed automatically following transmission of the first identity sequence. After the second sequence has been transmitted, the alarm system verifies that the identity number $N_c$ does indeed correspond to the number that it has stored, and it executes the algorithm A2 for computing the value of the cryptogram $Q_1$ on the basis of the value of the cryptogram $Q_0$, and on the basis of the confidential data $G_c$ without having to compute said confidential data as is the case in the two preceding applications. If the values of the cryptograms $Q_1$ and $C_1$ are equal, the cryptogram $Q_0$ takes a new value which is equal to the value of the cryptogram $C_1$, and the initialization of the alarm system is finished for this card.

The card is then delivered to the user together with the keys of the vehicle, it being possible for the user to receive a plurality of cards but in a limited number (two or three for example) which are initialized for the alarm system of the same vehicle.

In this application, each card is more generally in the form of a small box which is equipped at least with a radio-frequency output interface.

Under these conditions, when the user comes close to the vehicle, the user presses on a button provided on the box to cause an identity sequence to be transmitted, which sequence contains at least the identity number $N_c$ and the value of the cryptogram $C_i$ which are stored in the box. After transmission, the alarm system verifies that the identity number $N_c$ is indeed equal to the number that is stored in its memory, and it executes a plurality of times the algorithm A2 for computing the successive cryptograms $Q_1, Q_2, \ldots$, until a cryptogram $Q_n$ is found whose value is equal to the value of the cryptogram $C_i$ contained in the identity sequence transmitted by the box, after a predefined number of iterations.

If this synchronization first step is satisfied, the alarm system gives a new value to the cryptogram $Q_0$ that is equal to the value of the cryptogram $C_i$, and it unlocks the doors of the motor vehicle automatically. Otherwise, the user is then presumed to be an attacker making a fraudulent attempt to force open the doors of the motor vehicle, and an alarm may be triggered automatically.

In this application, the synchronization first step suffices for authentication to be performed. It should also be noted that, in this application, the cards are not personal.

In the above-considered applications, the identification protocol is of the one-way type because only the server requests the card to communicate identity sequences to it to enable it to authenticate the card.

However, in the context of the invention, it is also possible to envisage an identification protocol of the both-way type to enable mutual authentication to be performed between a card and a server.

In which case, during the synchronization step, the card and the server interchange the values of the cryptograms $C_i$ (card) and $Q_0$ (server) so that, on the basis of the values of these cryptograms $C_i$ and $Q_0$, the cryptogram $C_{i+1}$ can then be computed by the card and so that the cryptogram $Q_1$ can then be computed by the server. The server informs the card of the value of the cryptogram $Q_1$ so as to enable said card to authenticate the server by comparing the values of the cryptograms $Q_1$ and $C_{i+1}$. If these values are not equal, access to the card is refused. If they are equal, the card computes the value of the cryptogram $C_{i+2}$ and transmits it to the server to enable the server to authenticate the card by is comparing the value of this cryptogram $C_{i+2}$ with the value of the cryptogram $Q_2$ computed by the server. If these values are equal, access to the server is validated. Otherwise access is refused.

Finally, in other applications of the personal radio pager type, a transmitter (call server) can send a message to a plurality of portable receivers. However, it may be desirable to encode the transmitted message so that only the receiver to which the message is addressed can decode it.

In this application, the value of the cryptogram $C_i$ (at the transmitter) can be initialized on the basis of any value and, to send a message, the server computes in particular the successive values of the cryptograms $C_{i+1}$ and $C_{i+2}$, and it then encodes the message on the basis of the value of the cryptogram $C_{i+2}$.

Then the server sends an identity sequence containing the identity number $N_c$ of the receiver that is to receive the message, the values of the cryptograms $C_i$, $C_{i+1}$, and the encoded message. The receiver $N_c$ which receives the identity sequence computes the value of the cryptogram $Q_1$ on the basis of the value of a cryptogram $Q_0$ which has the value of the cryptogram $C_i$ transmitted by the transmitter. If the value of the cryptogram $Q_1$ is equal to the value of the cryptogram $C_{i+1}$, then the receiver computes the value of the cryptogram $Q_2$ which is therefore equal to the value of the cryptogram $C_{i+2}$ and enables the receiver $N_c$ to decode the message.

I claim:

1. A method of enabling a server to authorize access to a service from portable devices having electronic microcircuits comprising:

initializing each portable device and a server;

when a user requests access from a portable device, in a synchronization first step, causing the portable device to transmit at least a first identity sequence containing at least an identity number ($N_c$) allocated to the portable device and a cryptogram ($C_i$) computed by processing circuits of the portable device;

transmitting the first identity sequence to the server via a terminal;

causing processing circuits of the server to use an iterative algorithm (A2) to compute successive cryptograms ($Q_1, Q_2, \ldots$) based on a cryptogram ($Q_0$) stored in the server and whose value is equal to a value of a cryptogram ($C_{i-n}$) contained in a most recent identity sequence transmitted by the portable device to the server, until a cryptogram ($Q_m$) is found whose value is equal to the value of the cryptogram ($C_i$) contained in the first identity sequence;

giving a new value to the cryptogram ($Q_0$) stored in the server, which new value is equal to the value of the cryptogram ($C_i$) contained in the first identity sequence;

in an authentication second step, causing the access request to be validated by the server only if at least the synchronization first step has been satisfied;

in the authentication second step and once the synchronization step has been satisfied, causing the portable device to transmit a second identity sequence containing at least the identity number ($N_c$) of the portable device and a new cryptogram ($C_{i+1}$) computed by the portable device on the basis of the value of the cryptogram ($C_i$) contained in the first identity sequence and stored in the portable device;

transmitting the second identity sequence to the server via the terminal;

causing the server to execute the algorithm (A2) so as to compute the cryptogram ($Q_1$) on the basis of the value of the cryptogram ($Q_0$) stored in the server;

causing the access request to be validated by the server only if the values of the cryptogram computed by the portable device ($C_{i+1}$) and the cryptogram computed by the algorithm ($Q_1$) are equal; and giving a new value to the cryptogram ($Q_0$) stored in the server, which new value is equal to the value of the cryptogram computed by the portable device ($C_{i+1}$).

2. The method according to claim 1, further comprising:
   causing each portable device to compute and store a new cryptogram ($C_{i+1}$) when the portable device transmits an identity sequence containing the previously computed cryptogram (Ci).

3. The method according to claim 2, further comprising:
   causing the iterative algorithm (A2) for computing the cryptograms by the portable devices and by the server to take into account confidential data ($G_c$) allocated to the portable device by an authorized person.

4. The method according to claim 3, wherein each portable device is initialized by an authorized person prior to delivering the portable device to a user and wherein the initialization operation causes at least the following items of information to be stored in the portable device:

an identity number ($N_c$) allocated to the portable device;

confidential data ($G_c$) allocated to the portable device; and the value of an initial cryptogram ($C_0$) to enable the processing circuits of the portable device to be able then to compute the successive cryptograms ($C_1$, $C_2$, ...).

5. The method according to claim 4, further comprising:

diversifying the confidential data ($G_c$) allocated to each portable device on the basis of base data, and on the basis of an algorithm (A1) corresponding to a function (F1) having a secret key ($K_s$) the base data being the identity number ($N_c$) allocated to each portable device.

6. The method according to claim 5, wherein the server is initialized by an authorized person prior to delivering a portable device to a user, and the initialization operation causes the server to store at least the following items of information for each portable device:

the identity number ($N_c$) allocated to the portable device;

the secret key ($K_s$) enabling the server to be able then to compute the value of the confidential data ($G_c$) that has been allocated to the portable device; and a cryptogram ($Q_0$) whose value is equal to the value of the initial cryptogram ($C_0$), the value of said initial cryptogram being arbitrary.

7. The method according to claim 5, wherein the server is partially initialized prior to delivering the portable device to the user, the partial initialization operation comprises:

causing an authorized person to store, in the server prior to delivering a batch of portable devices to users:

at least the identity numbers ($N_c$) allocated to the portable devices and the secret key ($K_s$) associated with the batch of portable devices to enable the server then to compute the value of the confidential data ($G_c$) that has been allocated to each portable device; and in that the server initialization operation is completed when the user requests access to the server for the first time from a portable device, a completion of the initialization comprises:

causing the portable device to transmit a first identity sequence containing at least the identity number ($N_c$) allocated to the portable device and the initial cryptogram ($C_0$) stored in the portable device;

transmitting the first identity sequence to the server via a terminal;

verifying that the identity number ($N_c$) corresponds to a number allocated to the batch of portable devices;

associating, in the server, this received identity number with a cryptogram ($Q_0$) whose value is equal to the value of the initial cryptogram ($C_0$);

causing the portable device to transmit a second identity sequence containing at least the identity number ($N_c$) allocated to the portable device and successive cryptogram ($C_1$) stored in the portable device;

transmitting the second identity sequence to the server via the terminal;

causing the server to execute the algorithm (A1) so as to compute the value of the confidential data ($G_c$) allocated to the portable device;

causing the server to execute the iterative algorithm (A2) so as to compute the value of the cryptogram ($Q_1$) computed on the basis of the value of the cryptogram ($Q_0$) associated with the identity number ($N_c$) of the portable device, and on the basis of the confidential data ($G_c$);

verifying that the value of the cryptogram ($Q_1$) computed by the server is equal to the value of the cryptogram ($C_1$) transmitted by the portable device;

giving a new value to the cryptogram ($Q_0$) associated with the identity number ($N_c$) stored in the server, which new value is equal to the value of the cryptogram ($C_1$) stored in the portable device so as to finish initializing the server; and causing the server to validate the access request only if at least the server initialization operation has been successfully finished.

8. The method according to claim 7, further comprising:

diversifying the value of the initial cryptogram ($C_0$) on the basis of base data, and on the basis of the algorithm (A1) having a second secret key ($K_m$) different from the secret key ($K_s$), the base data being the identity number ($N_c$) allocated to the portable device.

9. The method according to claim 4, further comprising:

during the initialization of the portable device, giving the initial cryptogram ($C_0$) the value of the confidential data ($G_c$) allocated to the portable device.

10. The method according to claim 9, wherein the server is initialized by an authorized person prior to delivering a portable device to a user, the initialization operation further comprises:

causing the portable device to transmit an identity sequence containing at least the identity number ($N_c$) allocated to the portable device, and the initial cryptogram ($C_0$);

transmitting this initialization sequence to the server via a terminal;

storing in the server the identity number ($N_c$) allocated to the portable device;

associating the identity number ($N_c$) with a cryptogram ($Q_0$) whose value is equal to the value of the initial cryptogram ($C_0$) and with confidential data ($G_c$) whose value is equal to the value of the initial cryptogram ($C_0$);

causing the portable device to transmit a second identity sequence containing at least the identity number ($N_c$) allocated to the portable device and the cryptogram ($C_1$) stored in the portable device;

transmitting the second identity sequence to the server via the terminal;

causing the server to execute the algorithm (A2) so as to compute the value of the cryptogram ($Q_1$) computed by the server on the basis of the value of the initial cryptogram ($Q_0$) associated with the identity number ($N_c$) of the portable device and on the basis of the confidential data ($G_c$);

verifying that the value of the cryptogram ($Q_1$) computed by the server is indeed equal to the value of the cryptogram ($C_1$) transmitted by the portable device;

giving a new value to the cryptogram ($Q_0$) associated with the identity number stored in the server, which new value is equal to the value of the cryptogram ($C_1$) transmitted by the portable device so as to finish initializing the server; and causing the server to validate the access request only if at least the server initialization operation has been successfully finished.

11. The method according to claim 1, wherein the cryptogram ($C_i$) is computed by an iterative algorithm (A2) being executed that is based is on a non-invertible secret-key function (F2), and being such that its value is computed at least on the basis of the value of the preceding cryptogram ($C_{i-1}$).

* * * * *